UNITED STATES PATENT OFFICE.

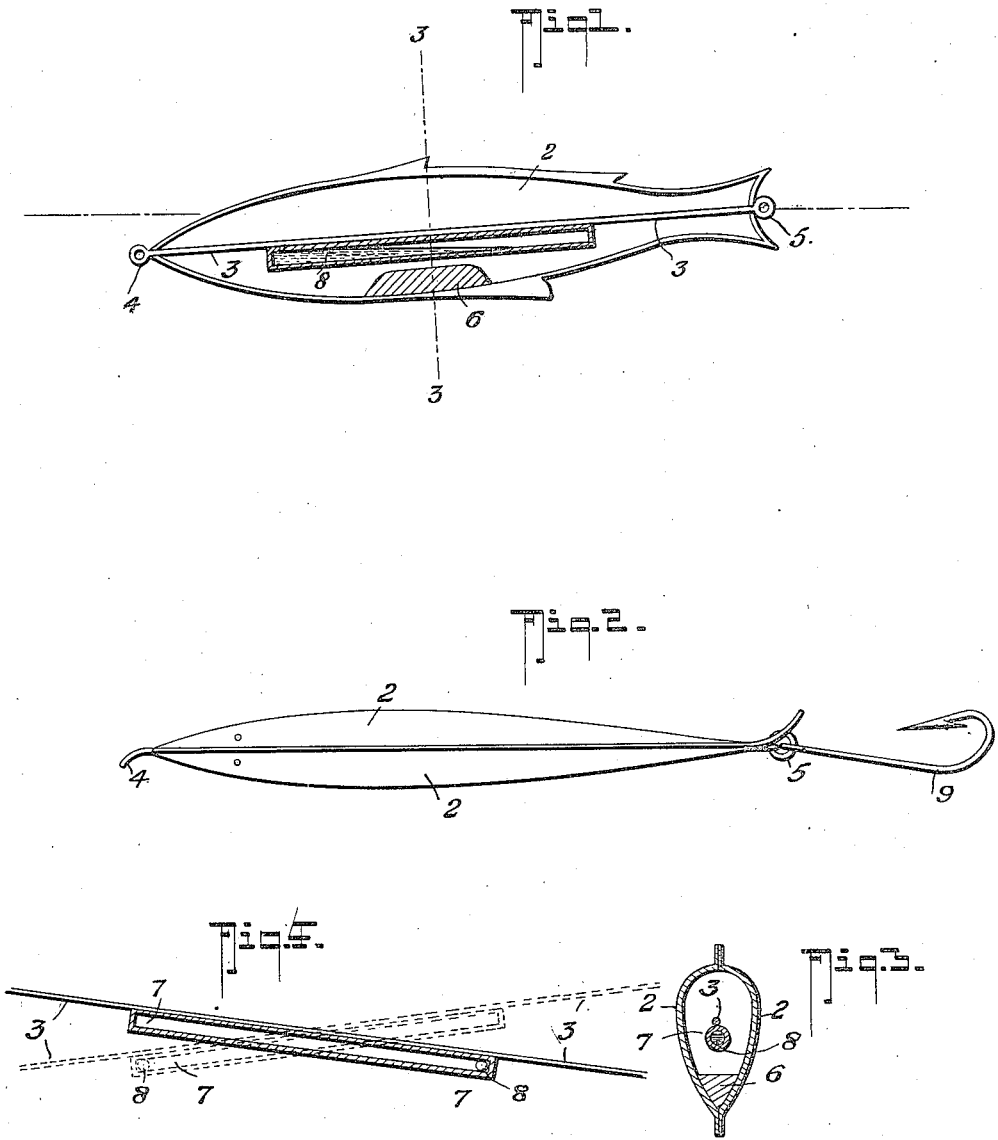

LOWRIE W. CAMERON, OF VANCOUVER, BRITISH COLUMBIA, CANADA.

ARTIFICIAL FISH-BAIT.

1,272,003.     Specification of Letters Patent.     Patented July 9, 1918.

Application filed September 25, 1917. Serial No. 193,107.

*To all whom it may concern:*

Be it known that I, LOWRIE W. CAMERON, a citizen of the Dominion of Canada, residing at Vancouver, in the Province of British Columbia, Canada, have invented certain new and useful Improvements in Artificial Fish-Baits, of which the following is a specification.

This invention relates to an artificial fish bait which is designed to effectively simulate, while being trolled, the erratic movements of a small fish.

The invention is particularly described in the following specification, reference being made to the drawings by which it is accompanied, in which:

Figure 1 is a vertical longitudinal section of the bait.

Fig. 2, a plan of the same.

Fig. 3, a cross section on the line 3—3 in Fig. 1, and

Fig. 4 is a detail showing a modification of the center of gravity changing means.

The bait comprises a hollow body 2 shaped to resemble a small fish and having the representation of the fins and tail. This body is preferably made of two plates stamped and embossed to the conformation of the fish and soldered together along their edges to be air-tight. Passing axially through this hollow body and soldered in it at each end is a wire rod or stem 3, having an eye 4 at the head end for the attachment to it of the trolling line swivel, and at the tail end an eye 5 for connection of the hook 9. The bait is ballasted as at 6 to maintain it on an even keel and with its longitudinal axis normally horizontal.

Secured to the underside of the stem 3 or to the body 2 of the bait is a length of tube 7 within which a relatively small quantity of mercury is sealed.

When a bait similar to this, but without the mercury in the tube 7, is being trolled, the varying tension imposed on the fishing line, either by the pull of the oars or otherwise, alternately lifts the head of the bait slightly above the horizontal, and between the tensions the weight of the sinker on the fishing line will pull the head down below the horizontal. These changing inclinations are however, so slight that they cannot materially alter the course of the bait, which would only undulate slightly from the horizontal line, but with this bait that is the subject of this application, as the head is raised above or allowed to fall below the horizontal by a very small amount, the mercury 8 within the tube 7 flows to the lower end and immediately accentuates the angle of inclination of the bait and the direction of its movement, so that under the varying tension of the trolling line it pursues a pronounced vertically sinuous course which adds materially to its killing power as a bait.

This is not only because the movement simulates more closely that of the small fish on which certain food fishes, such as the salmon, feed, but beyond that the bait ranges through a greater depth of water, and is on that account more likely to come within the vision and reach of fish trolled for, which feed at different depths according to weather changes.

With this vertically sinuous movement is combined a laterally sinuous movement due to the lateral bend of the tail and the opposite bend of the trolling line connection at the head. This feature is, however, common with artificial bait of this kind.

Although mercury is believed to be the most suitable material to effect the desired change in the position of the center of gravity of the bait, the change may be effected by any material that will move freely endwise under a slight change of angle from the horizontal.

Fig. 4 shows a modification wherein a weighty ball is endwise movable within a tube or lengthwise ball race of any kind.

Having now particularly described my invention, I hereby declare that what I claim as new and desire to be protected in by Letters Patent, is:

1. An artificial bait which comprises an elongated body, a rod passing through the body in substantially the central axis thereof, a closed tube carried by the rod, and a freely shiftable weight sealed within the tube.

2. An artificial fish bait, comprising the combination with an elongated body having provision at one end for connection to it of the trolling line and at the other for connection of the hook, of a tube lengthwise disposed within the body in which tube a freely shiftable weight is sealed.

3. An artificial bait comprising the combination with an elongated hollow body having provision at one end for connection to it of the trolling line and at the other end for connection of the hook, a weight freely movable endwise within the body forward and aft of the center of gravity thereof.

4. An artificial fish bait, comprising the combination with an elongated hollow body shaped to resemble a fish, said body having provision at one end for connection of a trolling line to it, and adjacent the other provision for connection to it of a hook, means for ballasting the body to maintain it normally on an even keel and to maintain its longitudinal axis substantially horizontal, and a tube horizontally disposed within the body, said tube having a shiftable weight sealed within it.

5. An artificial fish bait, comprising the combination with a hollow body shaped to resemble a fish, said body having a rod passing lengthwise through it with an eye at each end, ballast to maintain the body normally on an even keel and to maintain the longitudinal axis substantially horizontal, and a tube with a small portion of mercury sealed within it lengthwise disposed along the axial stem.

6. An artificial fish bait, comprising the combination with a hermetically sealed hollow body shaped to resemble a fish, the tail of which is laterally bent to one side, a rod with an eye at each end passing lengthwise through and secured to the body, the eye at the head end being laterally bent opposite the tail, ballast to maintain the body on an even keel and to normally maintain the longitudinal axis substantially horizontal, and a tube lengthwise disposed along the axial stem, said tube having a small quantity of mercury sealed within it.

7. An artificial bait which comprises an elongated body, a rod passing through the body in substantially the central axis thereof, a closed tube carried by the rod, a freely shiftable weight sealed within the tube, and a fixed ballast secured within the body below the tube.

8. An artificial bait comprising the combination with an elongated body having provision at one end for connection to it of the trolling line and at the other end for connection of the hook, of a tube lengthwise disposed within the body and extending forward and aft of the center of gravity and a freely shiftable weight confined within said tube.

9. An artificial bait comprising the combination with an elongated body having provision at one end for connection to it of the trolling line and at the other end for connection of the hook, of a tube lengthwise disposed within the body and extending forward and aft of the center of gravity, a freely shiftable weight confined within said tube, said tube being located below the axial line of the bait.

In testimony whereof I affix my signature.

LOWRIE W. CAMERON.